United States Patent

[11] 3,573,737

[72] Inventor Jack Rosenberg
 Pacific Palisades, Calif.
[21] Appl. No. 697,847
[22] Filed Jan. 15, 1968
[45] Patented Apr. 6, 1971
[73] Assignee International Business Machines Corporation
 Armonk, N.Y.

[54] REDUCTION OF PROCESSOR LOADING IN A DEMAND COMPUTER SYSTEM FOR MACHINE TOOL CONTROL
7 Claims, 4 Drawing Figs.

[52] U.S. Cl. .................................................. 340/172.5, 235/151.11
[51] Int. Cl. .................................................. G05b 19/18, G06f 15/46
[50] Field of Search........................................ 235/157, 151.11; 340/172.5; 318/20

[56] References Cited
UNITED STATES PATENTS

| | | | |
|---|---|---|---|
| 2,922,940 | 1/1960 | Mergler | 340/172.5X |
| 3,286,085 | 11/1966 | Rado | 340/172.5X |
| 3,375,354 | 3/1968 | McGarrell | 235/151.11 |
| 3,390,315 | 6/1968 | McDonough et al. | 235/151.11X |

Primary Examiner—Paul J. Henon
Assistant Examiner—Melvin B. Chapnick
Attorneys—Hanifin and Jancin and John L. Jackson ABSTRACT: A system for reducing the loading of a processor and amount of core storage required when a processor is used to calculate command words for controlling the slides of a machine tool and a constant frequency oscillator external of the machine tool is used to gate the command words from core storage to the machine tool. The output of the oscillator is applied to a preset counter which has been loaded with a number equal to the reciprocal of the quantity comprising the desired feed rate over the maximum feedrate and ones commanding movement are entered into the bit position associated with the axis to be moved the furthest during the cutting of the segment.

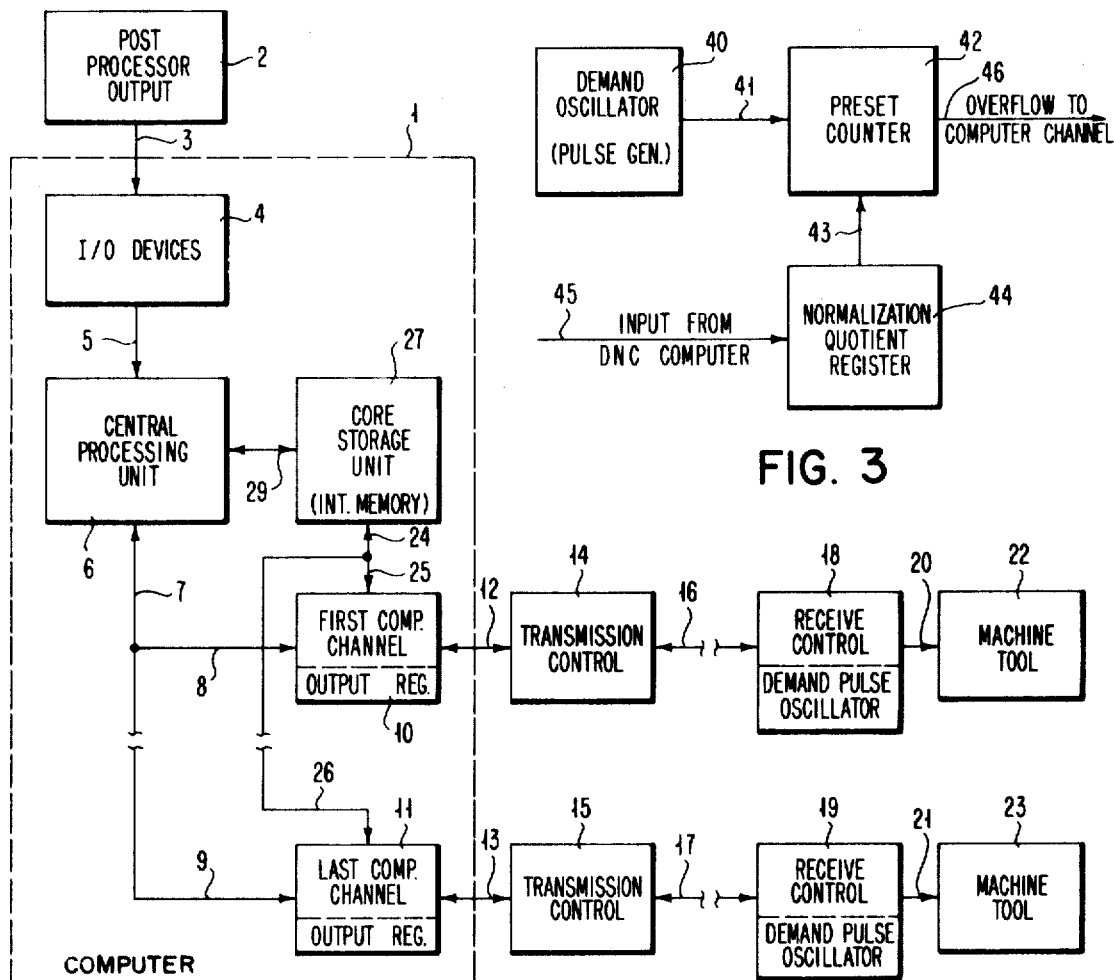

3,573,737

REDUCTION OF PROCESSOR LOADING IN A DEMAND COMPUTER SYSTEM FOR MACHINE TOOL CONTROL

BACKGROUND OF INVENTION

1. Field of Invention

This invention relates to the control of machine tools and other precise mechanisms by computers in general and, more particularly, to a system in which command words are gated from a core storage unit by means of an external oscillator.

2. Discussion of the Prior Art

In a patent application entitled "Demand Computer System for Machine Tool Control" by Jack Rosenberg, Roy H. Daw and David M. Bottles, assigned to the assignee of the present application, Ser. No. 697,849 filed Jan. 15, 1968 there is described a system for controlling a machine tool in which a demand oscillator is used to gate previously calculated command words from a core storage unit to the servos of the machine tool. In this system the frequency of the demand oscillator is set such that if a one-bit is contained in the same bit position of each command word, the machine tool will move at its maximum feed rate. Obviously, then, with this type of system, when the machine tool is to be moved at a rate less than the maximum feed rate, null words or words commanding no action bits are stored in core. That is, if a machine tool with a 0.001 inch resolution has a maximum vector feed rate of 60 inches per minute, it must receive a pulse every millisecond to drive at its maximum rate. Hence in this case, the sampling interval cannot be longer than a millisecond, and if the machine tool is driven at less than 60 inches per minute, some of the command words will be null words.

While this system as reduced to practice worked admirably in that the processor controlling the machine tool was in a wait loop a majority of the time, it is desirable that the loading of the processor, for a multimachine tool configuration, be reduced. At first brush it might appear that the calculation and storage of zero bits by the processor can be done in a relatively simple manner; however, it takes nearly as much processor time to calculate and store zero bits as it does to calculate and store one or action bits in a command word. Additionally, as is obvious, the storage of null words when a machine tool is to move at a rate less than its maximum feed rate, results in inefficient usage of core.

SUMMARY

Briefly, there is provided a system for reducing processor loading and required core storage in a system in which a demand oscillator external to the processor is used to gate the command words from output buffer tables in core storage to the servo system of the machine tool being controlled. In this system all calculations of command words are based on the assumption that the major axis will move at the maximum vector feed rate throughout the cutting of a segment and a corresponding adjustment is made in the rate at which the command words are sent to the machine tool.

In this system the reciprocal of the quantity comprising the desired feed rate over the maximum feed rate is entered into a preset counter which is pulsed by the demand oscillator. The overflow pulses from the preset counter are used as transfer pulses to gate the command words from core storage. When using the subject system and the interpolation technique described in the above mentioned patent application entitled "Demand Computer System for Machine Tool Control," setting the Q value for the major axis to the maximum permissible value before the interpolation process is begun will automatically generate command words with the proper bit patterns for the subject system. As defined in that application, the Q value for the major axis is the fraction of maximum feed rate desired for that axis.

BRIEF DESCRIPTION OF THE DRAWINGS

FIG. 1 is an overall block diagram illustrative of a control system utilizing a demand pulse oscillator for each machine tool to be controlled;

FIG. 2 is a table illustrative of the command words which would be calculated and stored in core if a conventional oscillator system were used for gating words from core;

FIG. 3 is a block diagram illustrative of the operation of the demand pulse generator; and FIG. 4 is a table of command words calculated in accordance with the present invention which, when gated by the system of FIG. 1 will accomplish the same control as the command words of FIG. 2.

DESCRIPTION OF THE PREFERRED EMBODIMENT

The system of FIG. 1 is much like a conventional numerical control system as far as the part programmer is concerned. The part programmer describes a part to be cut and the manner in which the machine tool should proceed to cut it by writing a computer program using, for instance, the APT (AUTOMATIC PROGRAMMED TOOL) language to produce a cutter location tape (CL tape). The cutter location tape contains the absolute coordinates of the center line of the machine tool and the feed rate as it traverses the part being cut. A special postprocessor converts this information to a form and format required by the direct numerical control (DNC) computer. An example of the DNC computer would be the IBM 1800 Computer System with peripheral devices as described in the following manuals: "1800 Functional Characteristics Manual," IBM, Form No. A26-5819, 1956; "1800 Assembly Language Manual," IBM, Form No. C26-5882, 1956; "IBM Fortran Language Manual," IBM, Form No. C26-3715, 1956; "1800 TSX Manual (Time Sharing Executive)," IBM, 1956. The DNC computer 1 may be a general purpose, digital computer with an internally stored program to control the performance of its components parts or a hardwired configuration.

FIG. 1 illustrates the previously briefly discussed "Demand Computer System for Machine Tool Control" of the above referenced patent application. As shown in FIG. 1, the postprocessor output 2 is applied along line 3 to the I/O devices 4 such as those described in "1800 Functional Characteristics Manual" as referenced above, of the computer 1. The post processor output to computer comprises conventional computer output data, on any of various media and formats, from a general purpose computer system processing an automatic machine tool program, to be used to control of numerical control applications. An example of such a program is the IBM "APT" program and the "APT Part Programming" as outlined by IIT Research Institute, McGraw-Hill, 1967, Page 21-–28. As above indicated, the postprocessor output may be in the form of cards or magnetic tape. The output is converted in the I/O devices 4 into electrical signals of suitable level for use by the central processing unit 6 and these electrical signals are applied along line 5 to the CPU 6. Associated with the CPU 6, such as the IBM 1802 described in "1800 Functional Characteristics Manual" referenced above along line 29 is a core storage unit 27. This is a conventional unit such as that used in the IBM 1800 as described in the "1800 Function Characteristics Manual" referenced above connected in a conventional manner to the CPU. The core storage unit 27 is connected along lines 24 and 25 to a channel 10 and along lines 24 and 26 to a channel 11. The channels 10 and 11 are operative to bring the contents of selected areas of the core storage unit 27 into their output registers. A channel 10 is connected along lines 7 and 8 to the CPU 6 and channel 11 is connected along lines 7 and 9 to the CPU 6. As illustrated in FIG. 1, there may be one or a number of channels. As will hereinafter become apparent, a channel is required for each machine tool to be controlled. An example of the type channel that may be utilized is the computer channel used in the IBM 1800 which is specifically described in "Manual for RPQ C01–451, 2, 3, 4, 5" and "Channel Multiplexer for 1800:," IBM, Form No. L26–2103, 1956. The operation of the CPU 6 and channels 10 and 11 to bring the contents of selected areas of the core storage unit 27 into the output registers of the channels is conventional. A more complete description of this operation can be found for instance in the IBM Publications A26-5921, A26-5920 and A26-5918. Channel 10 is connected along line 12 to a transmission control unit 14 which, in turn, is connected along line 16 to a receive control unit 18. The receive control unit 18 is connected along line 20 to the machine tool 22. Likewise, channel 11 is connected along line 13 to a transmission control unit 15 which is connected along transmission lines 17 to a receive control unit 19. An example of the transmission control unit 15 would be the transmission control unit used in the IBM 360 as described in "IBM System 360 I/O from Interface Channel to Control Unit," IBM, Form No. A23-6843, 1964. It should be understood that the desired information read by the transmission control unit is in fact the command word. The suitable form for transmission being whatever is required for a selected transmission system, such as an digitally encoded electrical signal for an electrical communication line. An example of the receive control unit 19 would be the IBM 2701 as described in "IBM 2701 Parallel Data Adapter,"IBM, Form No. A22-6844, 1964. The receive control unit 19 is connected along line 21 to the machine tool 23. Examples of the type machine tools that may be controlled include the Adapter," Omni Mill and Gordon 230 Tape Master.

The transmission control units 14 and 15 perform two functions. First, they transmit pulses from the demand pulse oscillator of the receive control units to the channels to cause new words to be entered into the output register of the channels. Additionally, they amplify and shape the words received from the output register for transmission to the receive control units. Again, the sequential entering of words from the core storage unit 27 into the channels under control of an externally generated pulse is well known and is described in the above referenced manual. Briefly, the operation is as follows:

Each channel has two registers. The first register, a word count register will be loaded by the CPU with the number of words which the channel will read from core storage. A second register, the channel address register will be loaded by the CPU with the first address in core storage that is to be read from core into the I/O register. The pulses from the oscillator which are applied to each channel are used to gate the address in the channel address register into the memory address register (not shown) of the core storage unit. Each time that the address from the channel address register is entered into the memory address register, the word count counter register is counted down and the address contained in the channel address register incremented (or decremented). When the word count register has been counted down to zero, any further transfer of the contents of the channel address register to the memory address register is inhibited. The CPU must then load a new address into the channel address register and a new count into the word count counter. Alternatively, a chaining process can be used which results in the automatic loading of these two registers without processor intervention.

In the above referenced patent application there is described an interpolation technique in which a register is utilized for each axis of the machine tool to be controlled. Numbers dependent on the distance and velocity of each axis are added to the registers and the overflow from the registers used to control the insertion of one bits in each of the command words. With this technique the register associated with the axis which is to move the maximum distance during the cutting of a segment is incremented with a value $Q_{maj}$ which is equal to the fraction of the maximum feed rate desired for the major axis. The Q value for any other axis is the ratio of displacement of that axis to that along the major axis. Thus, if $\Delta x$ =100, $\Delta y$ =50, and $\Delta z$ =25 and the desired velocity component along the x-axis is 30 inches per minute for a machine tool with a maximum vector feed rate of 60 inches per minute, then
$$Q_x = .50, \quad Q_y = \frac{\Delta y}{\Delta x} = .50$$
and
$$Q_z = \frac{\Delta z}{\Delta x} = .25$$

Each of these Q values is used to increment its associated register.

In FIG. 2 is shown a table which illustrates the makeup of ten command words which would result from the above briefly described interpolation technique with the $\Delta$ values and feed rates designated. In step 1, the Q value of the major axis, i.e. the x-axis, is added to its associated register. This value is 0.50 and will not result in an overflow, thus, zero bits are entered into the x-bit positions of the command word locations. Additionally, since no overflow resulted in the major axis register, the registers associated with the y and z axes are not incremented and zero bits are entered into their bit positions in the first command word. In Step 2, the value $Q_x$=0.50 is again entered into the x-register and an overflow occurs. Since $\Delta x$ is positive, a one is entered into the rightmost bit location of the x-axis position of the second command word in core. Since the register associated with the major axis has overflowed, each of the other axis registers is incremented with its respective Q value. The y-register therefore is incremented by 0.50 and the z-register is incremented by 0.25. However, since they do not overflow, zeros are entered into their bit positions in the second command word. In Step 3, the x-register is again incremented by 0.50, but since it did not overflow, zeros are entered into the x-bit positions of the third command word and the y and z registers again are not incremented and zeros are entered into their bit positions. During the fourth step the x-register again overflows and, therefore, a one is entered into the positive x-bit position of the fourth command word and the other two registers are incremented. Addition of 0.50 to the y-register results in an overflow and, therefore, since $\Delta y$ is positive, a one bit is entered into the rightmost y-axis bit position and the z-register is incremented by 0.25 such that it then holds a sum of 0.50. Since it did not overflow, zeros are entered into the z-axis bit positions of the fourth command word. The above process is repeated and from a consideration of the table of FIG. 2, it can be seen that with the eighth step all three registers will overflow and, therefore, ones will be entered into all of the axis locations of the eighth command word.

The table of FIG. 2 includes a number of null words and consequently the amount of core required to store the command words for cutting a segment is used inefficiently. While the inefficient utilization of core with this technique is a problem, a greater shortcoming of this technique is the loading of the processor. While the loading of the processor may not result in a problem in the control of one or two machine tools simultaneously, in a large multimachine tool configuration the loading of the processor could become critical. The loading problem is brought about primarily by the fact that it takes as much processing time and capability to generate the null words of FIG. 2 as it does to generate the words which command movement of the slides. It is this problem of inefficient core usage and processor loading which is alleviated by the present machine tool control system.

In the present system simply stated, the Q value of the major axis is adjusted to be 1.0 (rather than the fraction obtained by filling a binary computer word with ones). Thus, each command word will contain at least one 1-bit and compensation is accomplished by modifying the frequency and number of pulses from the demand pulse generator. FIG. 3 illustrates in block form the modifications which are made to the system of FIG. 1 in accordance with the subject invention. As shown in FIG. 3 each demand oscillator 40, which is the oscillator shown in FIG. 1 as demand oscillator 18, 19, which is associated with a machine tool is connected along a line 41 to a preset counter 42 which is set with a number along line 43 by a normalization quotient register 44 which, in turn, is loaded by the DNC (Direct Numerical Control) computer along line 45. The demand oscillator 40, such as the Hewlett Packard 212A pulse generator has a constant frequency sufficient to drive its associated machine tool at its maximum velocity and provides a train of equally spaced pulses along line 41 to the preset counter 42, such as the Hewlett Packard 5214L. When a number of pulses equal to the number set in the preset counter 42 has been received from the demand oscillator 40, an overflow will occur on line 46. The overflow pulses are transmitted to the computer channel to cause new command words to be read from core storage and set into the channel output register as described in patent application Ser. No. 697,849, referenced above. The preset counter 42 acts as a divider. The normalization quotient register 44 is a device which sets the preset counter. The number loaded into the normalization quotient register 44, such as that register contained in the Hewlett Packard 5214L, to set the preset counter 42 must be such that the pulses from the preset counter applied to the computer channel will be at a frequency which will drive the associated machine tool at the desired feed rate. It should be noted that loading the register 44 is a conventional operation of a digital computer in which the computer transmits a number into the register, where it is stored until a new number is transmitted, and that the frequency required to drive the associated machine tool at the desired feed rate can be determined by experimentation or as specified by the manufacturer. The number which is loaded into the normalization quotient register by the DNC computer is the reciprocal of the Q value of the major axis. Thus, if the Q value for the major axis is 0.50, the reciprocal of 0.50, which is 2.0, would be entered into the normalization register to set the preset counter to 2.0. Therefore, at the beginning of the cutting of each segment, the reciprocal of the Q value for the major axis is sent to the normalization quotient register to adjust the rate at which demand pulses are sent to the channel to gate out the command words which have previously been calculated as if the major axis has the maximum allowable Q value.

FIG. 4 is the chart of FIG. 2 modified such that the major axis positions of each command word have been adjusted so that they all contain one bits. That is, all null words have been eliminated. From a consideration of FIG. 4 it is readily apparent that the amount of core required to store these command words as well as the processor loading has been greatly reduced. The elimination of the null words has resulted in half as many words being stored in core. Thus, in accordance with the present invention, the command words which are gated into the servomechanism of the associated machine tool are only brought out half as often. Therefore, in the above example, where the actual feed rate over the maximum feed rate is 0.50, the reciprocal of 0.50 or 2.0 is entered by the central processing unit into the normalization quotient register which will then apply this number to the preset counter. The number of pulses from the preset counter, assuming a frequency of 1000 CPS will be 1000/2 or 500 pulses per second.

The technique of generating the command words shown in FIG. 4 highly similar to that described in conjunction with FIG. 2. The only difference is that $Q_{maj}$ ($Q_x$) is set to 1.00. In step one the addition of 1.00 to the $X$-register will result in an overflow and hence a 1-bit will be stored in the positive $x$-bit position of the command words and the other axis registers will be incremented. The $y$-register will then contain 0.50 and the $z$-register 0.25. The process is repeated and, as shown, 1-bits are put in the command words in the event of overflows.

In actual practice, a slight modification to the above-described technique is necessary. In the previous description, it was assumed that the constant frequency clock would produce exactly the number of pulses per second that would be needed to produce the maximum vector feed rate of the machine tool. However, a preset counter used as a divider can only divide the input frequency by integral values such as 1, 2, 3, 4, etc. Thus, if Q=0.75 for the major axis, the number 2 would have to be sent to the quotient register and assuming a 0.001 inch—60 inch per minute machine tool, 1000/2=500 demand pulses per second would be generated rather than the desired 750, if the clock frequency were 1000. Therefore, a severe sampling rate resolution problem exists for the situations where Q is not the reciprocal of an integer such as 0.5, 0.2, etc. Since the demand pulse rate should be controllable, with a resolution of 1 percent to 2 percent, smoothly up to the maximum pulse rate, a binary rate multiplier might seem to be a more suitable device than a preset counter. However, binary rate multipliers have the serious shortcoming that their output pulses are not uniformly spaced in time, which could cause instability in the operation of the servomechanisms receiving the pulse trains. This shortcoming of binary rate multipliers is serious enough to discourage their use. This problem of nonuniformity of pulses spaced in time can, however, be overcome by an appropriate combination of a constant-frequency clock and preset counter. For example, if a maximum demand frequency of 1000 pulses per second is required, a constant-frequency clock which produces 64,000 pulses per second with eight stages of binary counters could be utilized. The preset counter, when preset with the number 64 would provide a demand rate of 1000 pulses per second, a preset number of 65 would provide 64,000/65, or 985 pulses per second, a preset number of 66 would provide 64,000/66 or 970 pulses per second, etc., with a maximum resolution error of less than 1 percent. In this manner, a demand pulse rate can be achieved which is very close to the desired rate and with a pulse train which is uniformly spaced in time. This last property is ideal for the machine tool since a perfectly periodic pulse train results in uniform servoaction and thus, a smoother cut of the workpiece, and maximum freedom from servomechanical resonance effects.

For error analysis assume that the constant frequency clock produces 64,000 pulses per second. The number of pulses produced by the demand pulse oscillator per second is 64,000/$n$ where $n$ is the number set into the preset counter. When a frequency is desired it must be approximated by 64,000/$n$ where $n$ is selected to give the value closest to the desired value. Every value which could be desired for the machine tool operation is either of the form 64,000,/$n$ or is between two such values, i.e., is between 64,000/($n$+1) and 64,000/$n$ for some integer $n$. For a particular integer $n$ the largest resolution error in desired frequency associated with $n$ would occur if the desired value were halfway between the frequency associated with $n$+1 and that associated with $n$, i.e., if the frequency desired were [64,000/($n$+1)]+½(64,000/$n$ )−(64,000/$n$+1)].

This would give a relative error of $$\frac{\frac{1}{2}\frac{64,000}{n}-\frac{64,000}{(n+1)}}{\frac{64,000}{(n+1)}+\frac{1}{2}\frac{64,000}{n}-\frac{64,000}{(n+1)}}=1/(2n+1)$$

In the above application only integers from 64 through 64,000 need be considered so that the maximum resolution error will occur when $n$ is 64. This gives a relative error of 1/129= 0.00775 or .775% which is well within the practical allowable deviation.

In general, if $k$ stages are added to the preset counter and the frequency is multiplied by $2^k$ so that the clock frequency is $2^k$ thousand pulses per second the maximum resolution error will occur when $n=2^k$ in the expression 1($2n$=1) so the maximum relative resolution error is 1/($2^k$+1) and this can be made as small as desired by choosing $k$ sufficiently large.

In summary, there is provided a system for reducing central processor unit loading and required core storage in a system in which a demand oscillator external to the processor is used to gate the command words from core storage to the servo system of the machine tool being controlled. In this system all calculations of command words are based on the assumption that the major axis will move at the maximum vector feed rate throughout the cutting of a segment and a corresponding adjustment is made in the rate at which the command words are sent to the machine tool.

In this system the reciprocal of the quantity comprising the desired feed rate over the maximum feed rate is entered into a preset counter which is pulsed by the demand oscillator. The overflow from the preset counter is then used to gate the command words from core.

While the invention has been particularly shown and described with reference to a preferred embodiment thereof,

I claim:

1. A system for providing a pulse train in the form of a series of command words appearing in an output buffer to each axis servo of a machine tool to effect movement of the slides of said machine tool along the respective axes of said slides from input signals indicative of the length and velocity that each slide is to move during the cutting of a segment, said system comprising:

a processor, including said output buffer, receptive of said length and velocity input signals and having means to generate a plurality of said command words, each of said command words having a bit position for each slide containing command bits in accordance with whether the command word is to effect movement of each slide, and the bit position associated with the major axis, which is the one of said axes that is to move the greatest distance during the cutting of a segment, containing a command bit in each command word; and means external of said processor for generating transfer pulses at a predetermined frequency dependent on the $v$ velocity that said slide of said major axis is to move during the cutting of a segment which, when applied to said processor, cause said command words to be entered into said output buffer.

2. The system of claim 1 wherein said external means for generating said transfer pulses includes a preset counter, preset with a predetermined number, by the processor, and a constant frequency oscillator for supplying pulses to said preset counter, and said preset counter is arranged to supply an overflow pulse each time said counter receives a number of said supplied pulses equal to said predetermined number, and the overflow pulses from said preset counter are utilized as said transfer pulses.

3. The system of claim 2 wherein said predetermined number is a number equal to the reciprocal of the quantity comprising the velocity that said major axis is to move during the cutting of said segment divided by the maximum feedrate of said machine tool.

4. The system of claim 2 in which means are provided such that said preset counter is set such that said predetermined number can be no less than the least number, $n$, which can be set in said preset counter, and said constant frequency oscillator is selected such that the frequency thereof divided by $n$ will equal the maximum number of pulses for properly driving the machine tool.

5. The system of claim 2 wherein said processor includes a central processing unit to perform arithmetic and logic functions, a core storage unit storing said command words and operatively connected to said output buffer, said core storage unit including a memory address register for the transfer of data whose address is contained in said register to said output buffer, and a channel operative to load a desired memory address for the desired command words into said memory address register of said core storage under control of said external means whereby said command words contained in desired memory address location are transferred from said core storage unit to said output buffer.

6. The system of claim 5 in which said central processing unit is programmed to employ a separate register for each of the respective separate axes and to enter a one bit into the proper bit location of each command word, depending on the direction that the axis slide is to be moved, for each axis each time that the incrementation of said employed register with a number based on the distance and velocity said slide is to be moved results in an overflow.

7. The system of claim 6 in which the central processing unit is programmed to increment the register representing said major axis by one and to increment the other registers with a number $Q_{min}$ calculated as follows:

$$Q_{min} = \frac{\text{distance to be moved by respective axis slide}}{\text{distance major axis slide is to move}}$$